United States Patent [19]

Cox

[11] Patent Number: 5,078,456
[45] Date of Patent: Jan. 7, 1992

[54] BRAKE PEDAL RETAINING VEHICULAR ANTI-THEFT BRAKE LOCKING MECHANISM

[76] Inventor: Terry L. Cox, 9510 W. Park, Houston, Tex. 77063

[21] Appl. No.: 502,174

[22] Filed: Mar. 30, 1990

[51] Int. Cl.⁵ .................. B60R 25/08; B60T 17/16
[52] U.S. Cl. ........................ 303/89; 60/570; 180/287; 188/265; 188/353; 188/162; 188/2 D
[58] Field of Search ............ 303/89; 188/265, 67, 188/162, 353, 2 D; 180/287; 60/568, 569, 570, 594; 192/1.31-1.34; 92/18, 2

[56] References Cited

U.S. PATENT DOCUMENTS

| | | | |
|---|---|---|---|
| Re. 29,913 | 2/1979 | Case et al. ........................ 303/89 |
| 1,841,614 | 1/1932 | Loughead ...................... 60/570 X |
| 1,965,459 | 7/1934 | Fischer ........................ 188/353 X |
| 1,991,603 | 2/1935 | Dick ............................. 60/569 X |
| 2,030,753 | 2/1936 | McDonnell ...................... 188/265 |
| 2,065,176 | 12/1936 | Engel ............................ 188/265 |
| 2,106,304 | 1/1938 | McGee ........................... 60/54.6 |
| 2,387,126 | 10/1945 | Dillon ......................... 188/265 X |
| 2,544,043 | 3/1951 | Price ............................ 188/353 |
| 2,670,063 | 2/1954 | Reynolds ........................ 303/89 |
| 2,683,381 | 7/1954 | Cadwell ......................... 188/265 |
| 2,727,599 | 12/1955 | Melfi ......................... 188/353 X |
| 3,353,634 | 11/1967 | Farrar ........................ 188/162 X |
| 3,482,666 | 12/1969 | Case et al. ...................... 188/265 |
| 3,515,442 | 9/1970 | Whittemore ...................... 303/89 |
| 3,552,518 | 1/1971 | Aidner ......................... 188/265 X |
| 3,617,100 | 11/1971 | Wrigley ......................... 303/89 |
| 3,625,573 | 11/1969 | Conn ............................ 303/89 |
| 3,653,730 | 4/1972 | Cvetkovich ..................... 303/89 |
| 3,669,210 | 6/1972 | Haefner ....................... 303/89 X |
| 3,680,314 | 8/1972 | Toomey ........................ 60/570 X |
| 3,874,747 | 4/1975 | Case et al. ...................... 303/89 |
| 4,007,815 | 2/1977 | Acre ............................ 188/265 |
| 4,040,675 | 8/1977 | Richmond et al. .................. 303/89 |
| 4,093,050 | 6/1978 | Mizuno ....................... 188/265 X |
| 4,258,819 | 3/1981 | Baptiste, Sr. .................. 303/89 X |
| 4,579,202 | 4/1986 | McIntosh ..................... 188/353 X |
| 4,721,192 | 1/1988 | Cano et al. ................... 303/89 X |
| 4,873,824 | 10/1989 | Cox ............................. 60/545 |
| 4,934,492 | 6/1990 | Hayes-Sheen .................. 303/89 X |
| 4,942,949 | 7/1990 | Dai ........................... 188/265 X |
| 4,951,776 | 8/1990 | Jeter .......................... 303/89 X |

FOREIGN PATENT DOCUMENTS 2436059 2/1976 Fed. Rep. of Germany.

Primary Examiner—Douglas C. Butler
Attorney, Agent, or Firm—Sroufe, Zamecki, Payne and Lundeen

[57] ABSTRACT

Disclosed is a brake locking mechanism of the anti-theft type for use with a vehicular brake system having a brake actuating push rod reciprocable by a driver operated lever into the brake applying position. The brake lock comprises a locking mechanism attached to the brake pedal by an elongated linking member and a remote switch for engaging and disengaging the lock. The locking mechanism preferably comprises a pawl and ratchet assembly or a piston and fluid operated cylinder. The lock may be either manually activated by pressing on the brake pedal or automatically activated by positioning a three-way valve and engaging a pump.

9 Claims, 6 Drawing Sheets

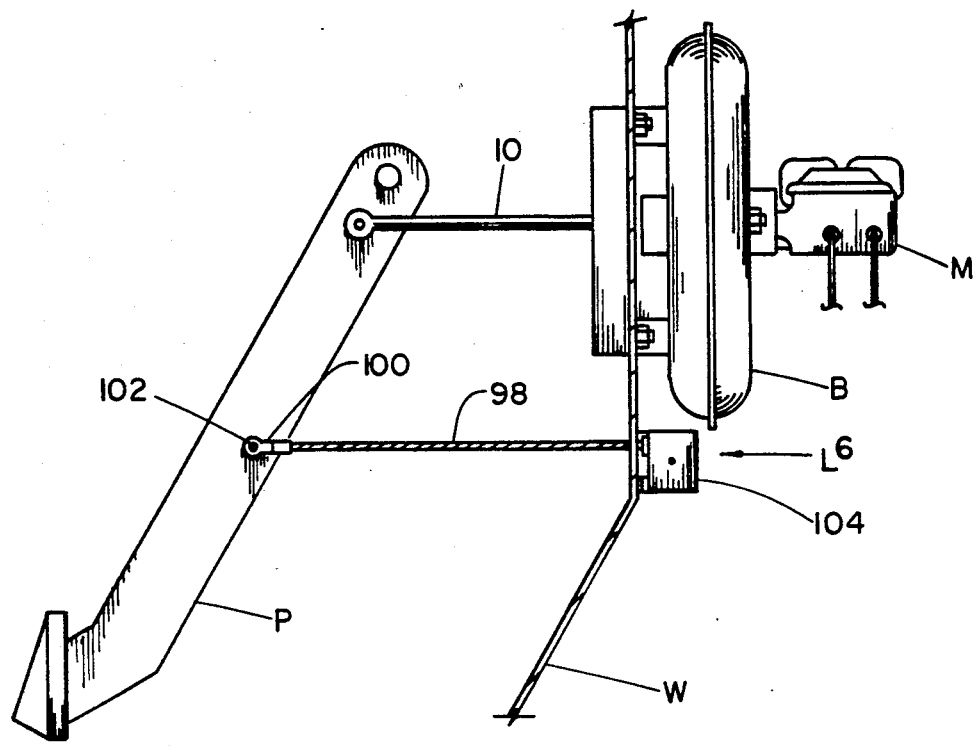
FIG. 11
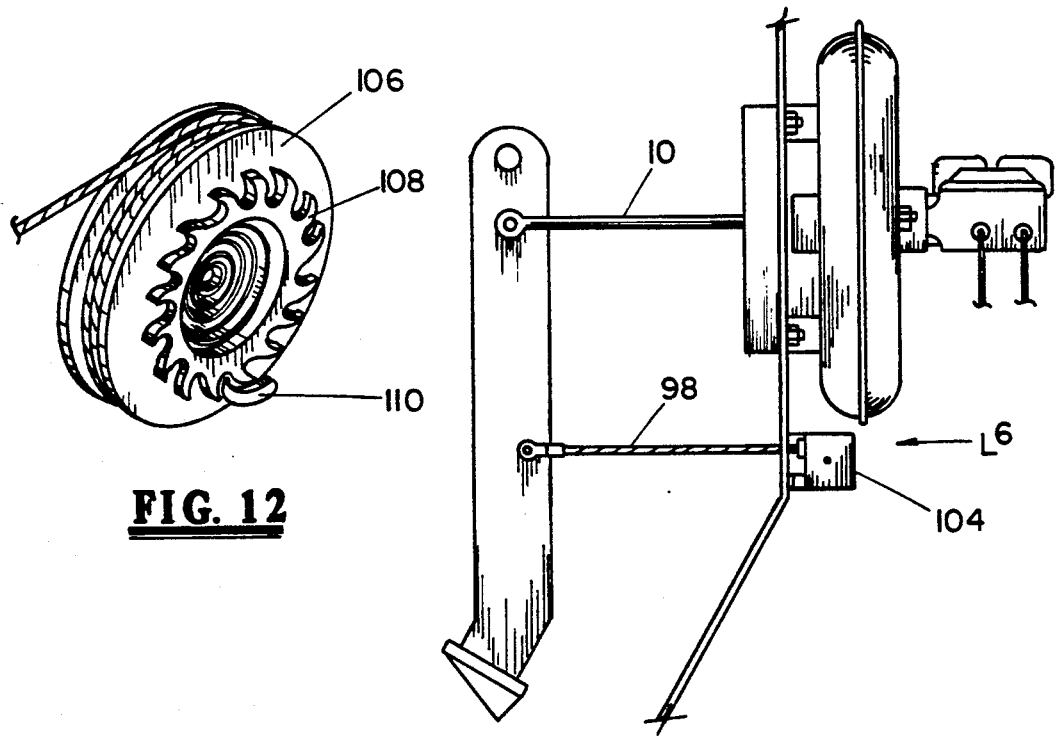
FIG. 12
FIG. 13

BRAKE PEDAL RETAINING VEHICULAR ANTI-THEFT BRAKE LOCKING MECHANISM

FIELD OF THE INVENTION

This invention relates to vehicular brake locking mechanisms, and particularly to such brake locking mechanisms for impeding theft of the vehicle.

BACKGROUND OF THE INVENTION

Brake locking mechanisms to deter or impede theft of vehicles such as automobiles, trucks, trailers and the like are well known. However, such mechanisms heretofor known have had one or more disadvantages. For example, in U.S. Pat. Nos. 3,482,666; 3,874,747; 4,007,815; and Re. 29,913; a brake locking mechanism is installed at each brake to prevent movement of an otherwise hydraulically or pneumatically operated brake rod mechanism. This involves installation of a brake locking device at each brake, generally modifying each existing brake to accommodate the locking mechanism, and installing an auxiliary control system to operate the brake locking mechanism.

Another type of brake locking mechanism involves positioning a valve in the brake power fluid line between the master cylinder and the brakes as seen in U.S. Pat. Nos. 4,040,675; 3,973,803; 3,653,730; 3,625,573; 3,617,100; and 3,515,442. With this mechanism, the brakes are locked in the applied position by pressurizing the brake fluid and then closing the valve in the brake fluid line to prevent release of the pressure. However, this type of mechanism has the disadvantage that installation in an existing brake system is complicated by the necessity of breaking the hydraulic fluid line. Further, it is generally a possibility in such systems that the valve in the brake line could close during operation of the vehicle, and thereby render the brakes inoperable while the vehicle is in motion.

My earlier U.S. Pat. No. 4,873,824, discloses a brake locking mechanism for use with an automobile vehicular brake system having one or more fluid operated brakes, a master cylinder and an actuator for reciprocating a piston in the cylinder to apply and release the brakes. The locking mechanism has a housing adapted to fit between the master cylinder and the actuator having means for reciprocating the piston responsively to the actuator including a ratcheted rod within the housing and a means for locking the reciprocating means with the piston in the brake applying position including a pawl operatively associated with the ratcheted rod. The locking means is remotely controlled from a control mechanism in the driving compartment which may be mechanical or electrical.

SUMMARY OF THE INVENTION

The present invention provides a brake locking mechanism which does not require a separate installation at each brake or breaking any brake fluid lines for installation, does not interfere with the normal operation of the brakes while the vehicle is in motion, can be installed either during manufacture or afterwards and may be activated by the single step of energizing an electrical switch.

The present invention provides a brake locking mechanism adapted for use in a vehicular braking system having a brake actuating push rod reciprocable by a pedal operable lever into a brake applying position. The mechanism includes an elongated linking member having first and second ends securely affixed to the pedal operated lever at the first end thereof, means for releasably locking the lever in the brake applying position receiving the second end of the linking member, and means for selectively engaging and disengaging the locking means. In one embodiment, the push rod is employed as the linking member; in alternate embodiments the linking member is a separate locking rod or cable. In either case, the brakes are locked by locking the linking member so that the brake pedal lever is secured in the brake-applying position.

The locking means in one embodiment comprises a pawl and ratchet assembly where the push rod (or locking rod) is ratcheted and the pawl operatively engages the ratchet teeth. The engaging and disengaging means may comprise a remotely operable cable having one end attached to a keyed lock and the other end operatively positioned to engage the pawl in the ratchet, or it may comprise a remotely operable solenoid operatively associated with a pawl for engaging the ratchet.

In another embodiment, the second end of the linking member is wound on a ratcheted spool and the engaging and disengaging means comprises a remotely operable pawl operatively associated with the ratchet, and may also include a motor for turning the spool to draw the brake pedal lever into the brake-applying position where it is secured by the pawl and ratchet mechanism.

In a further embodiment, the locking means comprises a piston affixed on the second end of the linking member and a cylinder slideably receiving the piston and defining fluid chambers on either side of the piston. The engaging/disengaging means comprises means for a fluid to communicate between the cylinder chambers and includes a check valve and a remotely operable valve in parallel with the check valve. In the open position, the remotely operable valve allows fluid communication between the chambers, and in the closed position prevents such communication to secure the brake pedal lever in the brake-applying position.

In another embodiment, the locking means comprises a piston affixed on the second end of the linking member and a cylinder slideably receiving the piston and defining a fluid chamber. The engaging/disengaging means comprises a pump for supplying fluid to the chamber and a remotely operable valve for venting fluid from the chamber. The fluid can be, for example, hydraulic fluid supplied from and vented to a reservoir, or air supplied from and vented to the atmosphere. In this embodiment, the brakes may be power-assisted into the brake applying position by actuation of the pump, and secured in this position until the vent valve is opened.

In yet a further embodiment, the second end of the linking member is securely affixed on one end to a locking lever and another end of the locking lever is securely affixed to a gear member. The gear member rotates responsively to a piston slideably positioned in a fluid operated cylinder and defining a fluid chamber. The engaging/disengaging means comprises a pump for supplying fluid to the chamber and a remotely operable valve for venting fluid from the chamber. The fluid can be, for example, hydraulic fluid supplied from and vented to a reservoir, or air supplied from and vented to the atmosphere. In this embodiment, the brakes may be power-assisted into the brake applying position by actuation of the pump, and secured in this position until the vent valve is operated.

In a further aspect, the invention provides a brake locking mechanism for use in a vehicle having a vehicular brake system with a brake actuating push rod reciprocable by a pedal operable lever into a brake applying position. The brake locking mechanism is adapted for use in a vehicle having an ignition switch, such as, for example, a keyed ignition switch conventionally found in automobiles. The mechanism comprises a linking member, a piston, a fluid pump, a three-way valve, a remote switch, a relay, a pressure switch and valve repositioning means. The linking member is elongated and has first and second ends. The first end is securely affixed to the pedal operable lever. The piston is slideable in a cylinder and defines a fluid chamber therewith. The piston is operatively connected to the second end of the linking member. The pump is adapted to introduce a pressurized fluid through a fluid line into the chamber so that the piston is displaced in the cylinder to pull, in turn, on the linking member so that the pedal operable lever of the vehicular braking system can be locked into the vehicle brake-applying position. The three-way valve is positioned in the line to operate between first and second positions. In the first valve position, the chamber is vented and fluid introduction from the pump into the chamber is blocked. In the second valve position, the valve closes the chamber vent and permits fluid communication between the pump and the chamber. The remote switch is adapted to actuate the pump. The relay is operatively associated with the vehicle ignition switch to prevent actuating the pump unless the vehicle ignition switch is in an "off" position. The pressure switch is in fluid communication with the line from the pump to the chamber to deactivate the pump when a predetermined pressure is applied to the cylinder. The remote positioning means is adapted to reposition the three-way valve between the first and second positions.

BRIEF DESCRIPTION OF THE DRAWINGS

FIG. 11 is a schematic of a further embodiment of a brake locking mechanism of the present invention having a locking cable linked in parallel to the brake actuating push rod, shown in an unlocked position.

FIG. 12 is a perspective view of a ratcheted spool used in the brake locking mechanism of FIG. 11.

FIG. 13 is a schematic of the brake locking mechanism of FIG. 11, shown in a locked position.

DETAILED DESCRIPTION OF THE INVENTION

Figure 1:
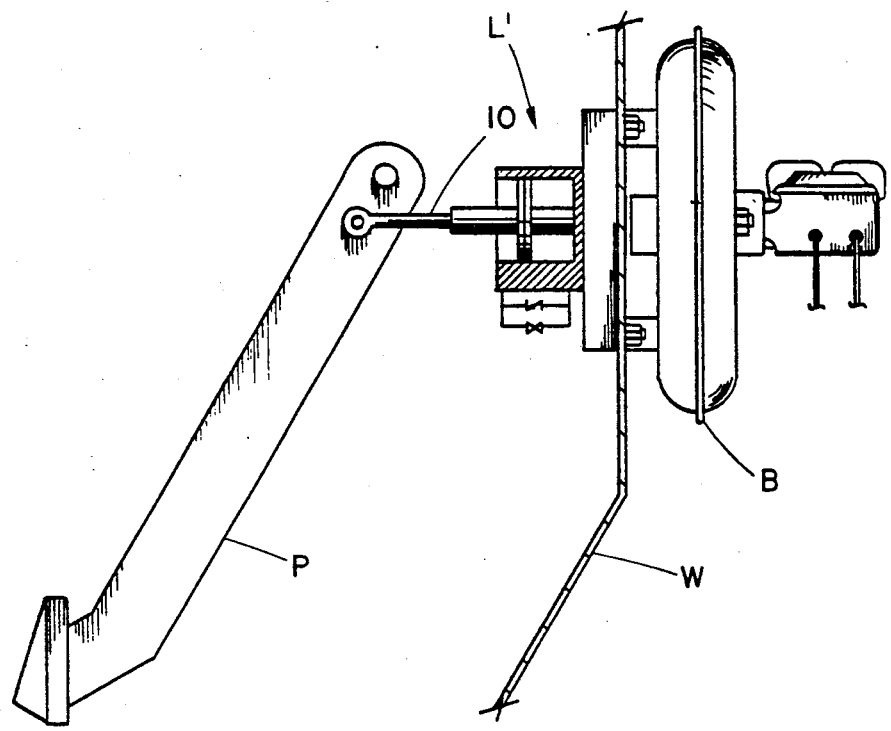
FIG. 1 is a schematic view, partly in section, of an embodiment of a vehicular brake system having a brake locking mechanism attached to the brake actuating push rod according to the present invention, shown in an unlocked position.

With reference to FIGS. 1-15, wherein like alphanumeric reference characters are used to indicate like parts, a brake locking mechanism which embodies the present invention is installed in a vehicular braking system which has a brake lever P for reciprocating brake actuating push rod 10 operated thereby.

The braking system may also include a power booster B and a master cylinder M which simultaneously activates a brake typically associated with each wheel of the vehicle. Brakes in conventional vehicular braking systems are hydraulically actuated; however, the present invention operates regardless of the type of brake actuation principle employed.

Figure 2:
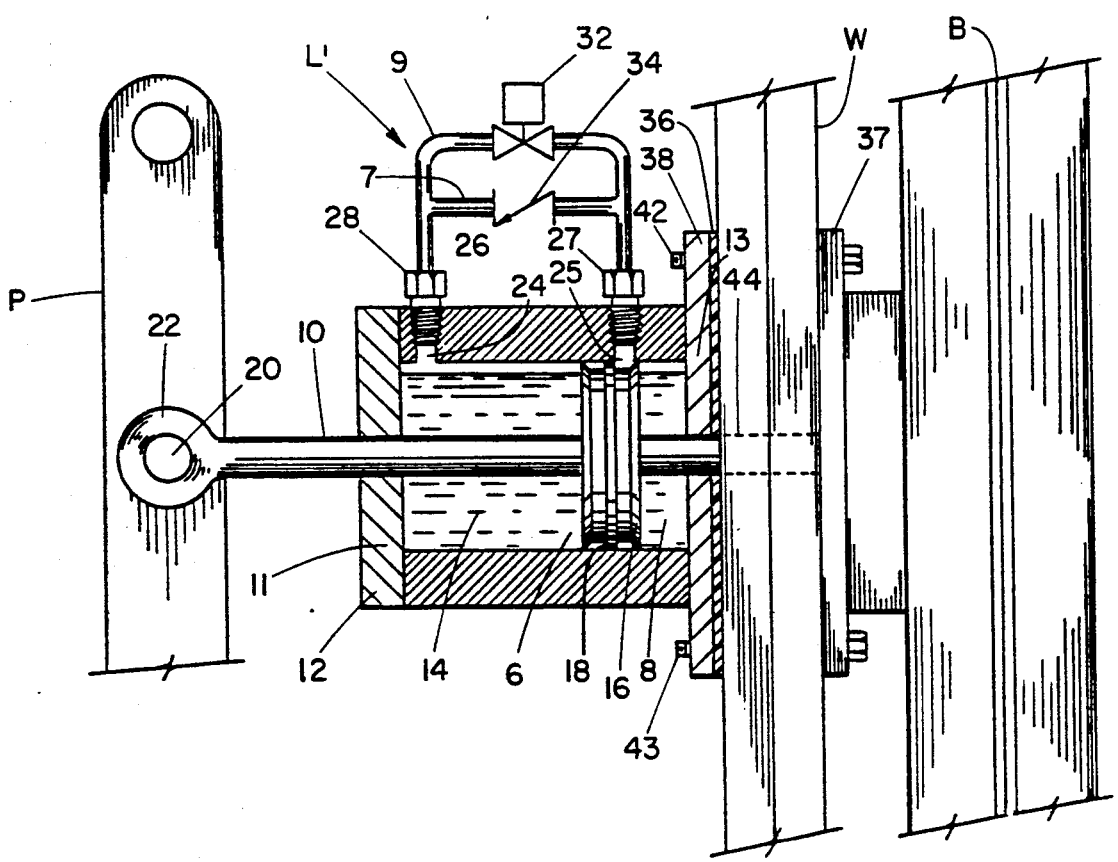
FIG. 2 is an enlarged side sectional view of the brake locking mechanism of FIG. 1, shown in a locked position.
Figure 3:
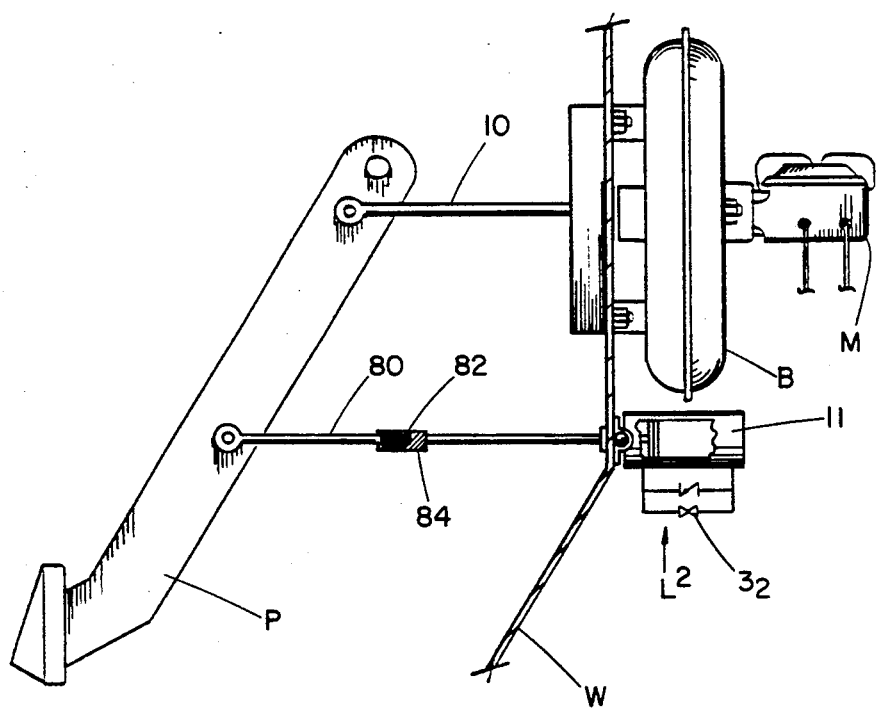
FIG. 3 is a schematic view, partly in section, of an embodiment of a brake locking mechanism according to the present invention having a locking rod linked in parallel to the brake actuating push rod, shown in an unlocked position.
Figure 5:
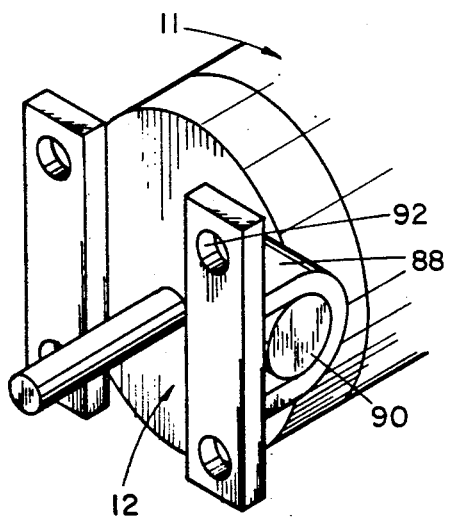
FIG. 5 is a perspective view of a bearing used in mounting the brake locking mechanism of FIG. 4.
Figure 6:
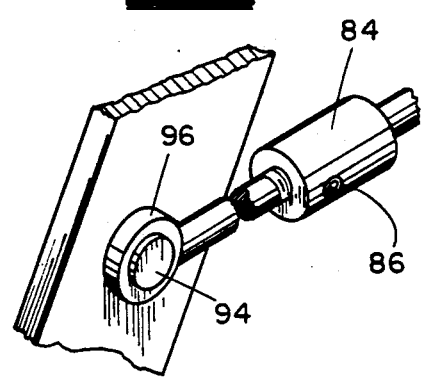
FIG. 6 is a perspective, partially cutaway view of connection fittings used in the brake locking mechanism of FIG. 4.
Figure 4:
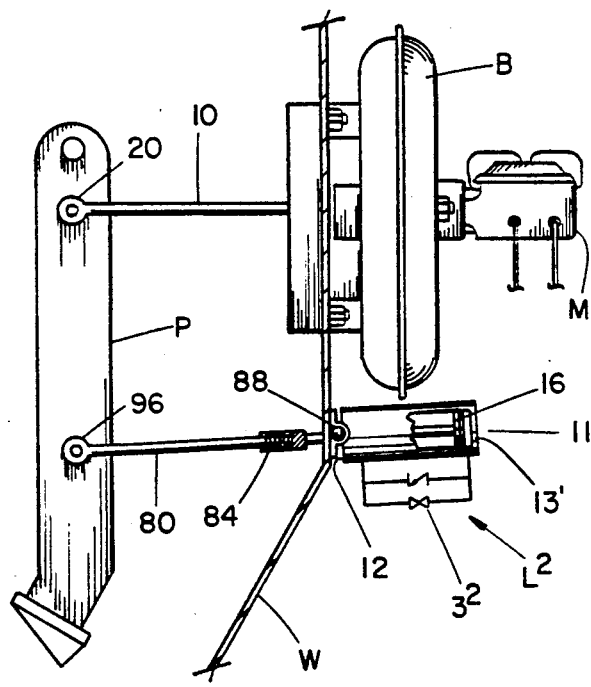
FIG. 4 is an illustration of the brake locking mechanism of FIG. 3 shown in a locked position.

According to an embodiment of the present invention, as best seen in FIGS. 1 and 2, the locking mechanism L¹ is disposed adjacent to either side of a fire wall W, between the lever P and the power booster B in a position engaging the push rod 10.

The locking mechanism L¹ includes a cylinder body 11 affixed on face 13 to the fire wall W inside the driver's compartment. A reciprocating piston 16 is fixedly attached to the push rod 10 which is in turn secured to the lever P by means of a conventional bearing 22 and journal 20. The cylinder body 11 is provided with apertured end-faces 12 and 13 which slideably and sealingly engage the push rod 10. The piston 16 is provided with a seal 18 and traverses a cylinder cavity 14 in the body 11. The face 13 is preferably flanged at the fire wall w by means of flanges 37 and 38, for example, with bolts 42 and 43. A seal gasket 36 fits between flanges 37 and 38. The cylinder body 11 has apertures 24 and 25 and fittings 27 and 28 through which an operating fluid is introduced into and/or discharged from chambers 6 and 8 defined in the cavity 14 by piston 16. A check valve 34 prevents fluid flow from chamber 6 into chamber s through line 7, and allows fluid flow only from chamber s into chamber 6 through line 7. Remotely operable valve 32 regulates fluid communication between chambers 6 and 8 through line 9 and typically is solenoid operated.

In the normal operation of the brake system, the piston 16 reciprocates responsively to the brake lever P by direct transfer of force through the push rod lo into brake engaging and disengaging positions. In normal operation the valve 32 is open to allow fluid to communicate between the chambers 6 and 8 as the push rod 10 and piston 16 are reciprocated. When it is desired to lock the brakes, the remotely operable valve 32 is closed. The lever P is depressed to engage the brakes and the piston 16 displaces fluid from the chamber 8 to chamber 6 through line 7 and check valve 34 which prevents the displaced fluid from flowing back into the chamber 8, thus locking piston 16 and push rod 10 in the brake-applied position. When the operator desires to disengage the brake lock, the fluid resistance against the piston 16 in the chamber 6 is released by opening valve 32 in line 9 so that the piston 16 once again reciprocates freely in normal operating mode.

As seen in FIGS. 3–6 in another embodiment of the present invention, the locking mechanism $L^2$ includes the cylinder body 11 wherein the end face 13' is not apertured and the end face 12 is provided with opposed journals 90 received in bearings 88 adjacent the fire wall W. The journals 90 in bearings 88 allow pivoting of the cylinder 11. A lock rod 80 is secured to the brake lever P with a journal 94 received in bearing 96 formed at one end thereof, and has its opposite end attached to the piston 16. A fitting 84 with a threaded bore 82 and locking pin 86 may be provided intermediate the cylinder 11 and lever P to facilitate installation of the locking rod 80 in parallel with the push rod 10.

Operation of the locking mechanism $L^2$ via remotely operable valve 32 is similar to that of $L^1$ described above. In normal operation of the brake system with valve 32 open, the piston 16 reciprocates responsively to the brake lever P between the brake engaging and disengaging position. With the valve 32 closed, the lever P is depressed and the lever P and push rod 10 are locked into the brake applied position (FIG. 4) by means of locking rod so held in position by piston 16.

The locking mechanism $L^2$ may be installed without disassembly of the conventional vehicular brake system or components, and access for such installation is facilitated by positioning the locking mechanism below the brake system components.

Figure 7:
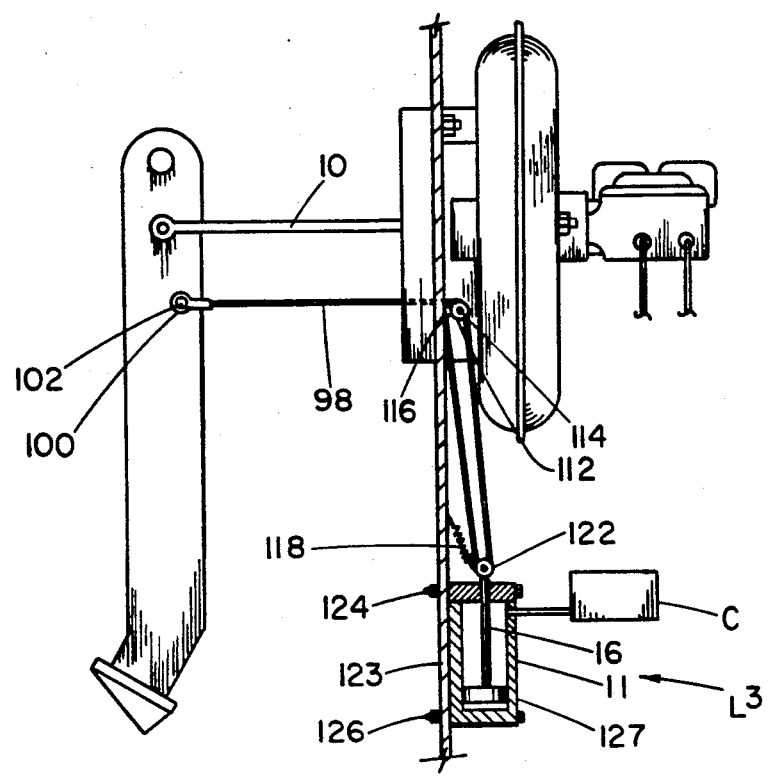
FIG. 7 is a schematic view, partly in section, of an embodiment of an automatically activated brake locking mechanism of the present invention having a linking member connected in parallel to the brake actuating push rod, shown in a locked position.

As best seen in FIG. 7, the locking mechanism $L^3$ has the cylinder body 11 located adjacent the fire wall w in the engine compartment. The brake lever P is linked to the piston 16 by a tamper resistant wire cable 98. The wire cable 98 is attached at one end, for example, by a fitting 100 and bolt 102 to the lever P and rolls over a pulley 112. The pulley 112 is held by a dowell 114 which is stationed by bearings 116 affixed to the fire wall W. The cable 98 passes through an aperture 111 in the fire wall w. The other end of cable 98 is looped around a second pulley 122 mounted on a distal end of a rod connected to the piston 16. The looped cable end is affixed against fire wall W. The piston 16 is spring-biased with a spring 118 to facilitate disengagement of brake locking mechanism $L^3$, but a double acting (spring-biased) piston could alternatively be employed for this purpose. Spring 122 is desirably adjusted to prevent cable 98 from pulling on brake lever P under normal operating conditions. This arrangement permits greater flexibility in the positioning of the cylinder 11 since it is not necessary to align the piston 16 movement with a rigid linking member. Cylinder 11 is preferably installed wherein the lever-arm length between push rod 10 and the cable 98 is as small as feasible to discourage tampering.

Figure 14:
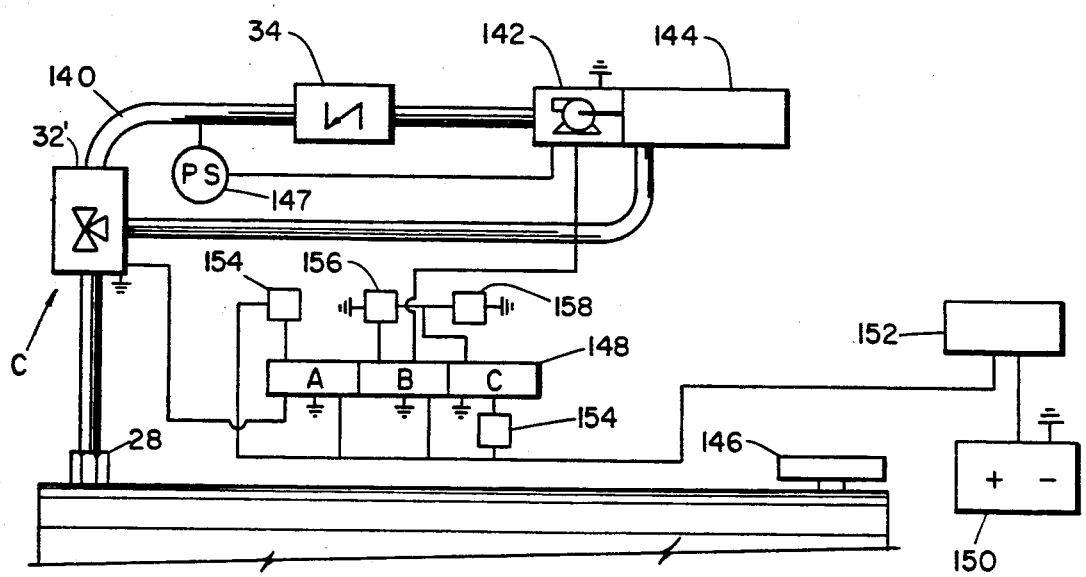
FIG. 14 is a schematic illustration of a hydraulic control system for automatically activating a brake locking mechanism according to the present invention.
Figure 15:
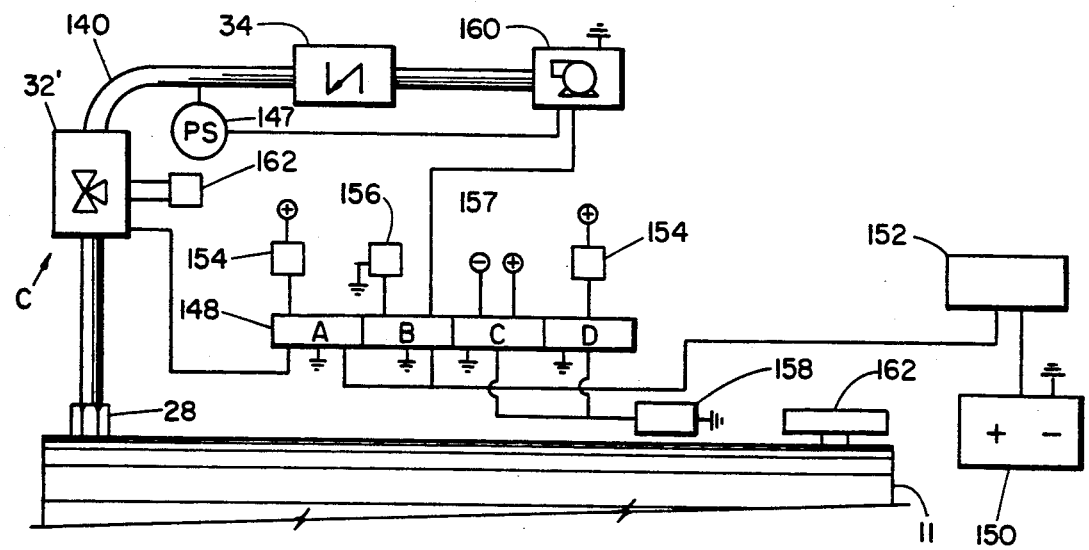
FIG. 15 is a schematic illustration of a pneumatic control system for automatically activating a brake locking mechanism according to the present invention.

In normal operation of the brake system equipped with the locking mechanism $L^3$, normal movement of the lever P and push rod 10 is not inhibited by the locking mechanism $L^3$, and slack in the cable 98 created thereby may, if desired, be taken up by a conventional tensioning mechanism (not shown). When it is desired to lock the brakes, the pressurized fluid source C is activated by a remote means, e.g. switch 156 or 156' (FIGS. 14 and 15, respectively). The switch 156 or 156' may be, for example, a keyed or combination switch, e.g. positioned in the driver's compartment of the vehicle or it may be operatively associated with a conventional vehicular alarm system such that arming of the alarm system engages the switch 156 or 156' to simultaneously engage the present brake locking apparatus. Pressurized fluid introduced into the cylinder 11 displaces the piston 16 which in turn draws the cable 98. Cable 98 pulls on lever P and positions the push rod 10 into the brake-applying position, thereby locking the brakes. When the operator desires to disengage the brake lock, the fluid pressure against the piston 16 is normalized by releasing the fluid from the cylinder 11 and the piston is returned by spring-biasing, allowing free travel of the lever P and push rod 10.

Figure 8:
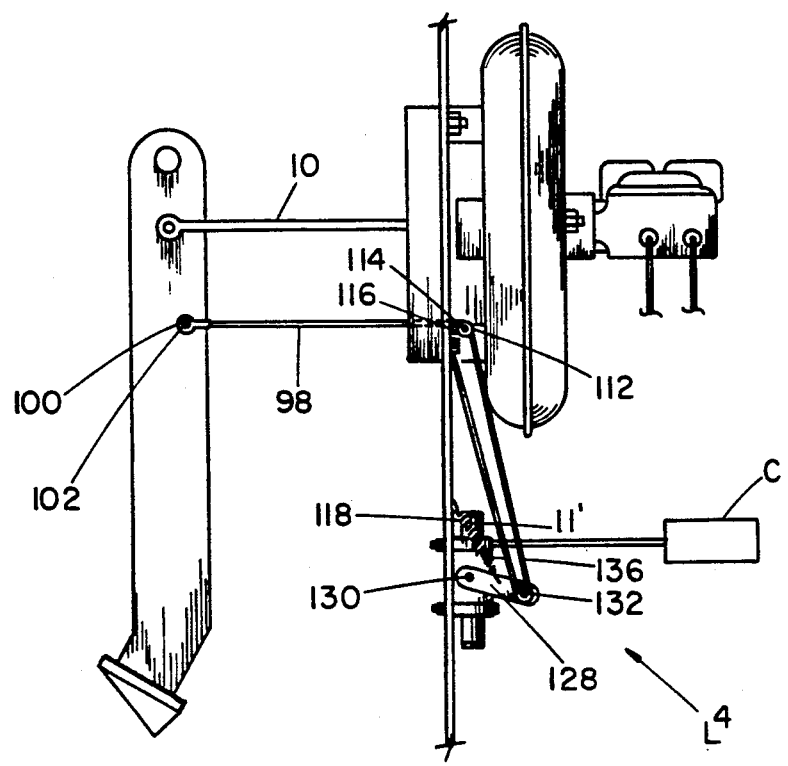
FIG. 8 is a schematic of an alternate embodiment of an automatically activated brake locking mechanism of the present invention having a linking member connected in parallel to the brake actuating push rod, shown in a locked position.

As best seen in FIG. 8, the locking mechanism $L^4$ has the cylinder body 11' located adjacent the fire wall W in the engine compartment. The brake lever P is linked to the piston 16 by a tamper resistant wire cable 98. The wire cable 98 is attached on one end to lever P as described above and rolls over the pulley 112 also previously described. The other end of cable 98 is looped around a pulley 132 affixed at one end of a locking lever 128. The other end of the locking lever 128 is securely affixed to a gear member 130. The looped end of cable 98 is affixed to the fire wall W. The locking lever 128 is similarly spring-biased with spring 118 as described above. Cylinder 11' has a gear housing 136 and a gearing (not shown) to translate reciprocal piston motion to radial gear motion. The arrangement of cylinder 11' enjoys similar installation benefit to that of cylinder 11 in locking mechanism $L^3$ and installation of the wire cable 98 preferably reduces the lever-arm formed thereby with push rod lc to the minimal length feasible.

In normal operation of the brake system equipped with locking mechanism $L^4$, ordinary movement of the lever P and push rod 10 is not inhibited by the locking mechanism $L^4$ and slack in the cable 98 created thereby may be treated as described previously. When it is desired to lock the brakes, the pressurized fluid source C is activated by the remote switch 156 or 156' (FIGS. 14 and 15, respectively). Operation of cylinder 11', by pressurized fluid source C, is similar to the operation of cylinder 11 in locking mechanism $L^3$ except that when the piston (not shown) in cylinder 11' is displaced by the pressurized fluid, the gear member 130 is rotated by the action of the displaced piston. The locking lever 128 is thereby rotated to draw on cable 98. The tensioned cable 98 pulls the lever P and push rod 10 into the brake applying position, thereby locking the brakes. When the operator desires to disengage the brake lock, the fluid pressure against the geared piston (not shown) is equilibrated by releasing the pressurized fluid from the cylinder 11'. Removing pressurized fluid from the cylinder 11' permits return of the locking lever 128 to the normal unlocked position, for example, by spring-biasing the piston and/or the lever 128, slackens cable 98 and allows free travel of the lever P and push rod 10.

Referring to FIG. 14, the pressurized fluid source C includes lines 140 suitable for high pressure, a means for pressurizing the fluid, the remotely operable three-way valve 32' and the check valve 34. The remotely operable three-way valve 32' is typically a solenoid operated valve. The pressurizing means in the example of hydraulic fluid operation, includes a pump 142, a reservoir 144 for the fluid to feed the pump 142 and for receiving the depressurized fluid, and a filter 146 to keep the hydraulic fluid free from particulate matter. The pressurizing means may also be by pneumatic operation (FIG. 15) including an air compressor 160 and filters 162. Pneumatic operation (FIG. 15) is the preferred pressurizing means for the pressurized fluid source C.

When it is desired to engage the brake locking mechanism $L^3$ or $L^4$, activating the remote keyed switch 156 or 156' completes an electrical circuit to initiate an engage sequence. The sequence includes energizing the pump 142 or the compressor 160, closing the three-way valve 32' from a fluid vented position for receiving pressurized fluid, and interrupting power to a rear brake light circuit. A pressure switch 147 is present to monitor pressure on the cylinder piston 16 and shuts compressor 160, for example, after attainment of the operating pressure specified by the pressure switch 147. Operating pressure may typically vary between about 40 psig to about 500 psig, preferably between about 80 psig to about 200 psig, but the specific operating pressure depends on the piston and cylinder design. At the operating pressure, lever P and push rod 10 are positioned tightly in the brake applied position. Check valve 34 and back pressure in line 140 preserves fluid pressure on piston 16 in cylinder 11 or 11' when compressor 160 or pump 142 is shut off.

Operational considerations reflect two additional concerns: (1) the brake locking mechanism provided should not be engagable during normal vehicular operation; and (2) the rear brake lights should operate normally during normal vehicular operation (but are desireably disengaged when the brakes are locked with the present brake locking apparatus).

An operating circuit is provided according to an embodiment of this invention to prevent accidental engagement of the brake locking mechanism by requiring keyed switch 156 or 156' to be interlocked with ignition switch 152. The circuit includes the keyed switch 156 (FIG. 14) or 156' (FIG. 15) relay 148B and ignition switch 152. Keyed switch 156 or 156' will not engage the locking mechanism unless the ignition switch 152 is turned off. Alternatively, or in addition, the keyed switch 156 or 156' may be interlocked with, for example, a linkage or gear shift lever associated with the vehicle transmission in a similar manner to prevent engagement of the brake locking mechanism unless the transmission is placed in "park."

A warning circuit is provided in the event that normal operation of the rear brake lights does not accompany brake locking mechanism disengagement. In one arrangement, illustrated in FIG. 14, this circuit includes the keyed switch 156 relays 148B, 148C, brake switch 158 in rear brake light circuit, ignition switch 152 and warning device 154A. The keyed switch 156 has two access positions. In a first position, switch 156 maintains normal electrical power to the rear brake lights. In a second position, power to rear brake lights is interrupted and the locking mechanism provided by an embodiment of this invention is engaged. Upon disengagement, keyed switch 156 is reset to the first position to re-energize the brake light circuit. If electrical power to the rear brake lights is not detected under normal vehicular operation, warning device 154A energizes a warning sound and/or light.

In another arrangement illustrated in FIG. 15, the warning circuit includes relays 148C and 148D, brake switch 158, warning device 154B and ignition switch 152. When the locking mechanism provided by an embodiment of this invention is engaged by keyed switch 156', an electrical impulse directed to relay 148C opens relay 148C and interrupts power to the brake light circuit. During normal operation, continued power interruption to the brake light circuit caused, for example, by faulty relay 148C, activates warning device 154B to energize a warning sound and/or light.

A third operational circuit may be present in locking mechanism embodiments $L^3$ and $L^4$ of the present invention corresponding to operation of the remotely operated three-way valve 32'. In the preferred installation method, three-way valve 32' is installed so as to require a power input to remain valved in the brake lock disengage position. Consequently, a circuit warning the vehicular operator of power loss to three-way valve 32' during normal vehicular operation should be included. The three-way valve 32' may also be installed so that power is required for the three-way valve 32' to remain valved in the brake lock engage position. This installation method, however, is vulnerable to tampering by simple disconnection of power to the brake locking mechanism $L^3$ or $L^4$, and therefore, a backup power source (not shown) may be included. This circuit includes three-way valve 32', relay 148A warning device 154 and ignition switch 152. Power loss to three-way valve 32' during normal vehicular operations initiates warning device 154 to energize a warning sound and/or light.

Inherent in the brake locking mechanisms $L^3$ or $L^4$ is automatic compensation for a faulty loss of fluid pressure. Pressure switch 147 will engage pressurizing means 142 or 160 if detection of a minimum pressure value designed in switch 147 occurs with the brake locking mechanism $L^3$ or $L^4$ engaged. Typically the minimum pressure value is set at about 80 psig.

When an operator desires to disengage brake locking mechanism $L^3$ or $L^4$, pressurized fluid on cylinder piston 16 is dissipated when ignition switch 152 is switched on. The power impulse to three-way valve 32' switches valve 32' to the discharge position so that the pressurized fluid vents into the atmosphere, in the case of pneumatic operation, (FIG. 15) and into the hydraulic reservoir 144 in the example of hydraulic operation (FIG. 14). Two-position keyed switch 156 in the circuit embodiment illustrated in FIG. 14 is also reset into its first position. With vehicular operation, power is restored to the brake light circuit and interlock relay 148B prevents accidental engagement of pressurizing means 160 or 142.

It should be noted that certain types, makes and models of vehicles may have a vulnerable ignition switch 152, in which event keyed switch 156 or 156' may be utilized directly as the brake lock disengaging switch in place of ignition switch 152.

Remotely operable valve 32 is installed so that electrical power is required to close valve 32 and engage brake locking mechanism $L^1$ or $L^2$ (FIGS. 1-5). The control circuits illustrated in FIGS. 14 and 15 may also be used for the operation of brake locking mechanism $L^1$ or $L^2$ except that relay circuit 148A is not necessary and the output of relay 148B is connected to remotely operable valve 32 instead of the pressurizing means 142 or 160. Operation of the keyed switch 156 or 156' enables power to be directed to valve 32. Operationally, switch 156 or 156' is interlocked with the ignition switch 152 so that the ignition switch 152 must be switched off for brake locking mechanism $L^1$ or $L^2$ to be accessed. A backup power source (not shown) may be included for brake locking mechanisms $L^1$ or $L^2$.

The exemplary circuits illustrated in FIGS. 14 and 15 may also be utilized to interrupt power to rear brake lights operatively associated with vehicular braking systems when brake locking mechanism $L^1$ or $L^2$ is engaged. Also associated with the power interrupting circuits is a warning circuit to commence a warning sound and/or light if the rear brake lights fail to regain power during normal vehicular operation.

The pressurized fluid source C for the cylinders 11 or 11' in the present invention may be located in any convenient location in the engine compartment or trunk. It is advisable to keep components in the pressurized fluid source C out of sight and/or inaccessably positioned to discourage possible tampering.

Description of a lockable, keyed push button switch, a keyed barrel lock switch or combination lock switch is described in my earlier U.S. Pat. No. 4,873,824 which is hereby incorporated herein by reference.

Figure 9:
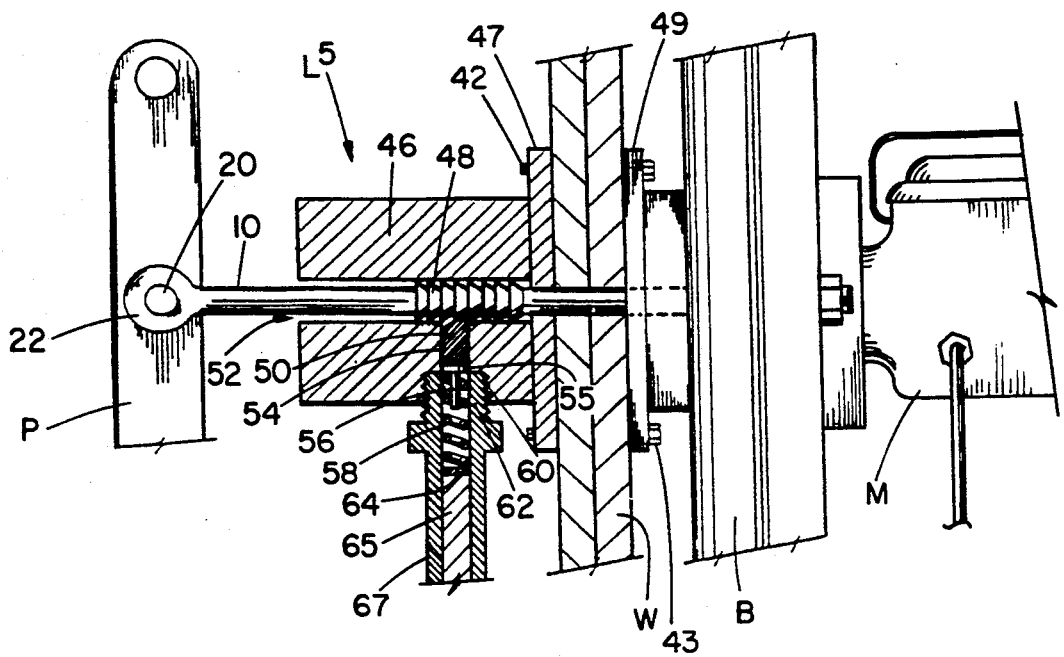
FIG. 9 is a side sectional view of an alternate embodiment of a vehicular brake system having a mechanically actuated brake locking mechanism attached to the brake actuating push rod according to the present invention, shown in a locked position.
Figure 10:
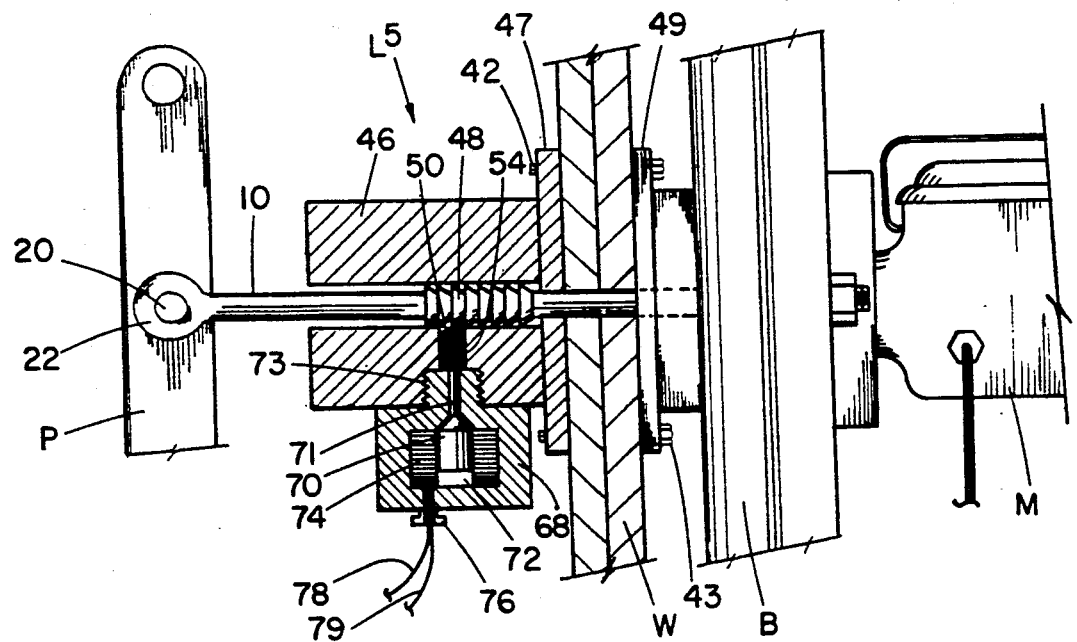
FIG. 10 is a side sectional view of an alternate embodiment of the brake locking mechanism of FIG. 9 employing an, electrically activated pawl and ratchet, shown in a locked position.

As seen in FIGS. 9-13, the locking mechanism in a further embodiment of this invention includes a pawl and ratchet assembly. In one embodiment, the locking mechanism $L^5$ is disposed adjacent to the brake lever P and the fire wall W in the driver's compartment. Referring to FIGS. 9 and 10, the locking mechanism $L^5$ has a housing 46 with one end attached to the fire wall W receiving the second end of the push rod 10. A bore 52 is formed longitudinally throughout the housing 46 and has the ratcheted second end of the push rod 10 positioned slideably therein. The rod 10 is provided with ratchet teeth 48 along a longitudinal exterior surface. A pawl member 50 is positioned in a recess 54 at an end adjacent to the bore 52 and rod 10 therein. The pawl member 50 may have any suitable shape, but is shown in the preferred shape of a semicircular annulus or washer. The transverse bore or port 54 is formed in the housing 46 to receive a pawl actuator.

The brake locking mechanism $L^5$ is readily installed in most conventional vehicular brake systems by disconnecting the brake lever P and push rod 10, between and reattaching the push rod 10 through the bore of the mechanism $L^5$ with the mechanism thereby secured to the fire wall, for example, by bolts. The housing 46 as seen in FIGS. 9 and 10 has a pair of longitudinal flanges 47, 49 on either side of the fire wall W for receiving bolts 42, 43 (others not shown).

In normal operation of the brake system when it is desired to lock the brakes, the pawl 50 is pushed inward against the rod 10 by a pawl actuator 64. Then the brake lever P is depressed by the vehicle operator which pushes the push rod 10 to engage the brake. The pawl 50 engages the teeth 48 preventing retraction of the push rod 10 with the brakes held securely in the brake applying position. In this manner, the vehicle cannot be driven without disengaging the pawl actuator 64 which may be controlled by a locked and/or hidden control mechanism. When the operator desires to disengage the brake locking mechanism $L^5$, the pawl actuator 64 is disengaged from the pawl 50 and the pawl 50 is retracted so that the rod 10 may move freely in the bore 54 and the brakes operate normally. In some embodiments, the brake lever P may have to be depressed following disengagement of the pawl actuator 64 in order to release the pawl 50 from the ratchet 48.

The pawl actuator 64 may be mechanically or electrically operated by remote mechanism or switch which is desirably hidden and/or locked with a key or combination, for example, to deter or impede unauthorized use of the vehicle. In FIG. 9 there is shown a keyed, mechanically operated embodiment of the pawl actuator 64. In this embodiment, a rod or cable 65 runs from the transverse bore 54 in the housing 46 to a remote location, such as, for example the dashboard or another convenient location of the vehicle operating compartment. The cable 65 is provided with a sleeve 67 connected to the housing 46 at the bore 54 by means of a nipple 62 in threaded engagement therewith. At the end of the cable 65 there is desirably provided the spring 58 for biasing the pawl 50, and the pin 56 disposed longitudinally in the spring 58 having a head 55 adjacent to the pawl 50. The pin 56 thus prevents the spring 58 from being overcompressed. The spring 58 also facilitates engagement of the pawl 50 by allowing for some limited movement thereof as the pawl 50 rises over the teeth 48 during travel of the rod lo during the locking thereof.

In an alternative embodiment illustrated in FIG. 10 the pawl 50 is engaged and disengaged electronically. A solenoid 74 is positioned at a bore 72 by, for example, threaded engagement of a solenoid nipple 73 therewith. The solenoid 74 is provided with a core 70 slideable therein and having a tapered portion 71 extending into the bore 54 adjacent the pawl 50. The solenoid 74 is desirably housed in a transverse extension 68 of the housing 46 in order to inhibit tampering therewith by unauthorized persons.

The solenoid 74 is operated by means of the switch 156 or 156' associated with circuits illustrated in FIGS. 14-15 except that relay switch 148A is excluded and output of relay switch 148B is connected to the solenoid 74 by means of wires 78, 79. The wires 78, 79 are desirably sheathed in a tamper-resistant sleeve (not shown). Switch 156 or 156' is interlocked with the ignition switch 152 as previously described. Power to the brake light circuit is also interrupted as previously described with a warning device provided. The switch 156 or 156' may be operated by a key or combination lock as desired. The description of the pawl actuator engaged by a lockable, keyed push-button device, for example or barrel lock is detailed in my aforementioned U.S. Pat. No. 4,873,824.

Another embodiment of the pawl and ratchet locking technique is illustrated in FIGS. 11-13. The locking mechanism $L^6$ is affixed adjacent to the fire wall on the engine compartment side. One end of a wire cable 98 is linked to the brake lever P as previously described and the other end is wound on a spool 106 attached to a winding means 104. The spool 106 has ratchet teeth 108 and a pawl 110 to engage the teeth 108 to prevent the wound cable 98 from unwinding. The spool 106 may be spring biased.

When it is desired to lock the brakes, a solenoid member (not shown) is energized by the keyed switch 156 or 156' associated with circuits illustrated in FIGS. 14 and 15 except that relay 148A is excluded and the output from relay 148B is connected to both the solenoid actuator and the winding means if electrically operated. The solenoid member prevents pawl 110 from releasing from teeth 108. Simultaneously, the winding means engages to rotate the ratcheted spool 106 and wind in the wire cable 98 thereby engaging the lever ? and the push rod 10 into the brake applying position. The winding means may be an electric motor, for example, also engaged by the switch 156 or 156'. The pawl 110 prevents the spool 106 from rotating in the direction opposite the locking direction, clicking into each succeeding tooth 108 as the spool 106 rotates. When the operator desires to disengage the brake locking mechanism $L^6$, the solenoid member (not shown) is de-energized. Solenoid member slips down from under the pawl 110 enabling the pawl 110 to be retracted from the teeth 108 in the spool 106. Once the pawl 110 drops the cable 98 wound on spool 106 unwinds. Slack in cable 98 releases push rod 10 and lever P from the brake applied position thereby releasing the brakes.

The locking mechanism of the present invention can be used to deter unauthorized use of the vehicle and/or as a parking brake. The locking mechanism of the present invention can also be used in association with other theft prevention devices, including ignition prevention devices, tampering alarms, and the like. The mechanism is readily installed on most vehicles since individual elements are available off-the-shelf requiring no special design. Installation is facilitated by requiring little, if any, disassembly of the vehicular braking system so that after-market installation is especially convenient.

The foregoing description of the invention is illustrative and explanatory thereof. Various changes in the materials, apparatus, and particular parts employed will occur to those skilled in the art. It is intended that all such variations within the scope and spirit of the appended claims be embraced thereby.

I claim:

1. A brake locking mechanism for use in a vehicle having a vehicle ignition switch and a vehicular brake system having a brake actuating push rod reciprocable by a pedal operable lever into a brake applying position, comprising:
   (a) an elongated linking member having first and second ends, said first end securely affixed to the pedal operable lever;
   (b) a piston slideable in a cylinder and defining a fluid chamber therewith, said piston operatively connected to said second end of said linking member;
   (c) a fluid pump for introducing a pressurized fluid through a fluid line into said chamber so that said piston is displaced in said cylinder to pull said linking member to position the pedal operable lever into the vehicle brake applying position;
   (d) a three-way valve positioned in said line operable between first and second positions, wherein said first valve position vents said chamber and blocks fluid introduction into said chamber, wherein said second valve position closes a vent and permits fluid communication between said pump and said chamber;
   (e) a remote switch for actuating said pump;
   (f) a relay operatively associated with the vehicle ignition switch to prevent actuating said pump unless the vehicle ignition switch is in an "off" position;
   (g) a pressure switch in fluid communication with said fluid line associated with said pump to said chamber for deactivating said pump when pressure in said line is above a predetermined set point;
   (h) means for remotely repositioning said three-way valve between said first and second positions.

2. A brake locking mechanism for use with a vehicular brake system having a brake actuating push rod reciprocable by a pedal operable lever into a brake applying position, comprising:
   (a) an elongated linking member having first and second ends, said first end securely affixed to the pedal operable lever;
   (b) means receiving said second end of said linking member for releasably locking the lever in the brake locking position, comprising a piston securely affixed adjacent said second end of said linking member, and a fluid-operated cylinder slideably receiving said piston and defining fluid chambers on either side of said piston; and
   (c) means for selectively engaging and disengaging said locking means, comprising means for introducing fluid into one of said chambers including a remotely operable three-way valve and means for pressurizing said fluid.

3. The mechanism of claim 2, wherein said linking member comprises a cable.

4. The mechanism of claim 3, wherein said cable is tamper resistant and rolls on a pulley assembly.

5. The mechanism of claim 2, wherein said engaging and disengaging means further comprises means for interrupting power to rear brake lights when said lever locking means is engaged.

6. The mechanism of claim 2, wherein said pressurizing means comprises a pneumatic compressor.

7. The mechanism of claim 2, wherein said pressurizing means comprised a hydraulic pump and reservoir.

8. The mechanism of claim 2, wherein said remotely operable means comprises a combination or keyed lock switch.

9. The mechanism of claim 8, wherein said keyed switch is interlocked with an ignition switch.

* * * * *